US012680917B2

(12) United States Patent
Sones

(10) Patent No.: US 12,680,917 B2
(45) Date of Patent: Jul. 14, 2026

(54) SOFT TARGET MOVEMENT PLATFORM

(71) Applicant: Anthony Best Dynamics Ltd., England (GB)

(72) Inventor: Michael James Sones, England (GB)

(73) Assignee: ANTHONY BEST DYNAMICS LTD., England (GB)

( * ) Notice: Subject to any disclaimer, the term of this patent is extended or adjusted under 35 U.S.C. 154(b) by 226 days.

(21) Appl. No.: 18/372,964

(22) Filed: Sep. 26, 2023

(65) Prior Publication Data

US 2024/0102889 A1       Mar. 28, 2024

(30) Foreign Application Priority Data

Sep. 27, 2022    (GB) .................................. 2214059.4

(51) Int. Cl.
*G01M 17/06* (2006.01)

(52) U.S. Cl.
CPC .................................. *G01M 17/06* (2013.01)

(58) Field of Classification Search
CPC .... G01M 17/06; G01M 17/007; G01M 17/00; B62D 11/04; B62D 5/0418; B62D 11/02
See application file for complete search history.

(56) References Cited

U.S. PATENT DOCUMENTS 9,725,115 B1      8/2017  Hauser et al.
2005/0244259 A1   11/2005  Chilson et al.

2007/0144814 A1 *  6/2007  Arnold ................... B62D 6/008
                                                            180/402
2013/0018528 A1    1/2013  Kelly et al.
2021/0048820 A1 *  2/2021  Trazkovich .......... G05D 1/0246
2021/0206430 A1    7/2021  North et al.
2021/0240188 A1 *  8/2021  Laaksonen ............. B62D 11/24
2021/0255064 A1    8/2021  Sones

FOREIGN PATENT DOCUMENTS

CN      107963148  A      4/2018
JP      H0699868  A      4/1994

OTHER PUBLICATIONS

Search Report for Related GB Application No. GB2214059.4, Issued Feb. 16, 2023; 4 pages.
Extended European Search Report for Related EP Application No. 23198636.5, Issued Mar. 14, 2024; 13 pages.

* cited by examiner

*Primary Examiner* — Timothy P Graves
(74) *Attorney, Agent, or Firm* — Sterne, Kessler, Goldstein & Fox P.L.L.C.

(57)            ABSTRACT

A soft target movement platform 181 for carrying a soft target is provided. The platform comprises: a first drive motor 187; a first driven wheel 185 driveable by the first drive motor; a second drive motor 191; a second driven wheel 189 driveable by the second drive motor; and a steering assembly 101. The steering assembly comprises: a steering motor 47; and an undriven wheel 43 arranged to be actively turned about a steering axis by the steering motor. The platform is steerable by a differential torque from the first and second drive motors to the respective first and second driven wheels, and steering assistance is provided by actively turning the undriven wheel about the steering axis by the steering motor.

19 Claims, 10 Drawing Sheets

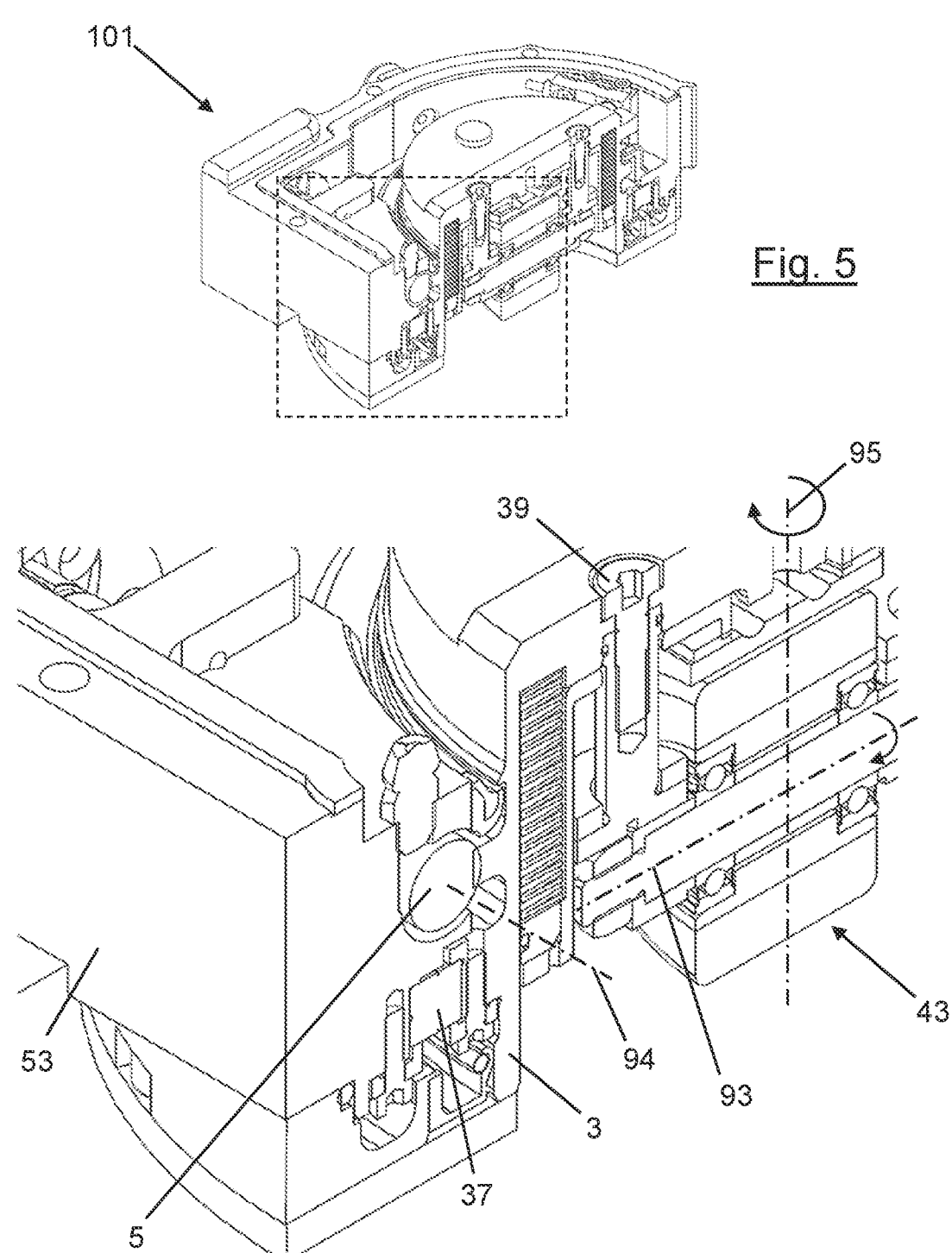
_Fig. 5_
_Fig. 6_

SOFT TARGET MOVEMENT PLATFORM

FIELD OF THE INVENTION

The present invention relates to steering assemblies and soft target moving platforms for use in vehicle testing, including but not limited to the testing of Advanced Driver Assistance Systems (ADAS). More particularly, but not exclusively, this invention concerns a soft target movement platform. The invention also concerns a steering assembly for a soft target movement platform, and a method of operating a soft target movement platform.

BACKGROUND OF THE INVENTION

Many modern vehicles now include Advanced Driver Assistance Systems (ADAS). To test ADAS in vehicles, it is desirable to replicate real-world scenarios in a consistently repeatable manner, and to measure how the ADAS reacts. In ADAS testing, a test vehicle may follow a predetermined path or manoeuvre to deal with a hazardous situation, such as a potential collision with another road user. In ADAS testing, soft targets are used and those are typically carried by soft target movement platforms.

A soft target is a copy of a real-world object or objects and is in a form that minimises or avoids damage to a test vehicle on impact during vehicle testing compared to the real-world object or objects. The soft target imitates road users, such as vulnerable road users. Examples of vulnerable road users include pedestrians, cyclists, electric kick scooter riders, and motorcyclists. Non-exhaustive examples of test vehicles include cars, motorcycles, and trucks.

Most soft target movement platforms are low-level devices to allow a test vehicle to safely impact the soft target located on the platform and to allow the test vehicle to drive safely over the platform. More vulnerable road users, such as the ones mentioned above, tend to be highly manoeuvrable and sometimes unpredictable. It is desirable to design platforms that imitate the real behaviour of vulnerable road users to optimise the ADAS and improve road safety. Platforms can be self-propelled and/or braked using their own systems. Advanced platforms can manoeuvre using their own steering systems. Such systems can be complex and add significant weight and space to the platform and it is desirable to address these aspects.

Furthermore, soft target movement platforms tend to be significantly heavier than the soft target. Platforms can also move at speeds in excess of an average human walking speed when imitating high-speed vulnerable road users (e.g. cyclists, motorcyclists, electric kick-scooter riders). Therefore, it is desirable to ensure the platform is safe for operatives working with the platform, especially as impacts can lead to an unexpected change of trajectory.

The present invention seeks to mitigate the above-mentioned problems. Alternatively or additionally, the present invention seeks to provide an improved soft target movement platform, a steering assembly for a soft platform, and/or method of operating a soft target movement platform.

SUMMARY OF THE INVENTION

The present invention provides, according to a first aspect, a soft target movement platform for carrying a soft target. The platform may comprise a first drive motor. The platform may comprise a first driven wheel. The first driven wheel may be driveable by the first drive motor. The platform may comprise a second drive motor. The platform may comprise a second driven wheel. The second driven wheel may be driveable by the second drive motor. The platform may comprise a steering assembly. The steering assembly may comprise a steering motor. The steering assembly may comprise an undriven wheel. The undriven wheel may be arranged to be actively turned about a steering axis by the steering motor. The platform may be steerable by a differential torque from the first and second drive motors to the respective first and second driven wheels. Steering assistance may be provided by actively turning the undriven wheel about the steering axis by the steering motor. Such an arrangement has been found to be beneficial because it may enable the platform to be highly manoeuvrable.

Soft target movement platforms in accordance with embodiments of the present invention, may actively steer using three wheels, two of which steer the platform by differential steering and a third wheel, not arranged to propel the platform, steers by turning. Such platforms may have improved manoeuvrability and responsiveness.

The platform may comprise a base to carry the soft target.

The first driven wheel may be a first side of the platform and the second driven wheel may be on a second side of the platform, the second side of the platform being opposite the first side of the platform, The first driven wheel may be driveable by a first input rotation force from the first drive motor. The first drive motor may be an electric motor.

The second driven wheel may be driveable by a second input rotation force from the second drive motor. The second drive motor may be an electric motor.

The undriven wheel may actively turn by a steering force from the steering motor. The steering motor may be an electric motor. The undriven wheel may be forward of the first driven wheel and/or second driven wheel. Such undriven wheels have been found to be beneficial because they may facilitate steering a platform in a controlled manner.

The platform may comprise a set of only three wheels for contacting the ground, the set of three wheels being the first driven wheel, the second driven wheel, and the undriven wheel. The platform may be two-wheel drive. The platform may be a maximum of two-wheel drive. The platform may comprise a maximum of two wheels, for example the first and second driven wheels. The undriven wheel may be free to rotate and not arranged to actively rotate. In other words, the platform may be propelled by a maximum of two wheels, the two wheels being the first driven wheel and the second driven wheel. The platform may be steered by a maximum of three wheels, the three wheels being the first driven wheel, the second driven wheel, and the undriven wheel.

The platform may comprise a central axis, optionally along a length and/or at the middle of a width of the platform. The platform may be configured such that the central axis is horizontal to the base of the platform and/or the ground when supporting the platform. The central axis may be equidistant to the first driven wheel and the second driven wheel. The undriven wheel may be located on the central axis. The steering axis of the undriven wheel may intersect the central axis. The platform may be configured such that the steering axis is vertical to the base of the platform and/or ground. The first and second driven wheels may be located at the same point along the central axis. The undriven wheel may be offset from the first driven wheel and/or second driven wheel along the central axis.

The first driven wheel may rotate about a first rotational axis. The first rotational axis may have an angle to the central axis that is fixed or at least substantially fixed. The first rotational axis may be fixed perpendicular to the central axis. The first rotational axis may be horizontal to the base of the platform and/or the ground when supporting the platform.

The second driven wheel may rotate about a second rotational axis. The second rotational axis may have an angle to the central axis that is fixed or at least substantially fixed. The second rotational axis may be fixed perpendicular to the central axis. The first rotational axis may be horizontal to the base of the platform and/or ground.

The first rotational axis may be parallel to the second rotational axis. The first rotational axis may be at least substantially coaxial or fixed coaxially to the second rotational axis. In use, the first rotational axis and/or the second rotational axis may be horizontal to the base of the platform and/or the ground when supporting the platform.

The undriven wheel may passively rotate about a rotational axis and actively turn about the steering axis. The rotational axis of the undriven wheel may be perpendicular to the steering axis. The steering axis may have an angle to the rotational axis of the undriven wheel and/or to central axis that is fixed. The steering axis may be fixed perpendicular to the rotational axis of the undriven wheel and/or to the central axis. The rotational axis may be constrained to move along and/or about the steering axis. In use, the rotational axis of the undriven wheel may be horizontal to the ground when supporting the platform. In use, the steering axis may be vertical to the ground when supporting the platform. The rotational axis of the undriven wheel may have an angle to the central axis that is variable. The rotational axis of the undriven wheel may be moveable towards and away from the central axis along a straight line.

The platform may comprise a controller configured to cause the first drive motor to output a first torque to the first driven wheel to drive the first driven wheel. The controller may be configured to cause the second drive motor to output a second torque to the second driven wheel to drive the second driven wheel. The first and second torque may be sufficient to propel the platform alone or in combination. The controller may be configured to cause the first and second torque to be equal or to vary. The controller may be configured to cause the steering motor to output a third torque to the undriven wheel to actively turn the undriven wheel.

The steering assembly may comprise a plurality of gears coupled between the steering motor and the undriven wheel. The steering assembly may comprise a housing mountable to the base of the platform. The plurality of gears may be arranged in the housing.

The steering assembly may comprise a first gear, optionally coupled to the steering motor. The first gear may be directly engaged to an output shaft of the steering motor (i.e. in the sense that no other gears are between the first gear and the steering motor). The steering assembly may comprise a second gear, optionally coupled to the first gear and the undriven wheel, such that rotation of the second gear by the steering motor causes the undriven wheel to actively turn about the steering axis. The first gear may be directly coupled to the second gear. The first gear may mesh with the second gear. The second gear may be indirectly coupled with the undriven wheel.

The first gear may comprise a rotational axis. The output shaft of the steering motor may comprise a rotational axis. The rotational axis of the first gear may be coaxial with the rotational axis of the steering motor. The second gear may comprise a rotational axis. The rotational axis of the first gear may extend in a direction that is different to a direction in which the rotational axis of the second gear extends. The rotational axis of the first gear may be perpendicular to the rotational axis of the second gear. The rotational axis of the first gear may be perpendicular to the steering axis of the undriven wheel. The rotational axis of the first gear may be horizontal to the ground when supporting the platform. The rotational axis of the first gear may be perpendicular to the central axis. The rotational axis of the second gear may be vertical to the ground when supporting the platform. The rotational axis of the second gear may be perpendicular to the central axis. The rotational axis of the second gear may be coaxial with the steering axis.

The first gear may be elongate. The first gear may be a worm gear. The second gear may be a worm wheel gear in meshing engagement with the worm gear. Such an arrangement has been found to be beneficial because it may enable the steering assembly to be compact. The worm wheel gear may be incapable of turning the worm gear (i.e. the worm gear may be non-back driveable). Such an arrangement has been found to be beneficial because it may improve predictability of a direction of travel of the platform upon failure of the steering motor.

The steering assembly may comprise a crossed roller bearing to support the second gear. The crossed roller bearing may be arranged to carry forces in a plurality of directions, such as radial and axial forces. Such an arrangement has been found to be beneficial because it may enable the steering assembly to be compact.

The steering assembly may comprise an axle and the undriven wheel may be mounted on the axle. The undriven wheel may be freely rotatable about the axle. That is, rotation of the undriven wheel is does not cause rotation of the axle because the undriven wheel and the axle are rotationally unlinked. The axle may be rotatably fixed with respect to the rotational axis about which the undriven wheel can rotate. The undriven wheel may be freely rotatable about the axle and supported by a bearing, for example a pair of bearings. The pair of hearings may be located on opposite sides of the undriven wheel along the axle.

The undriven wheel may be moveable between a compression position and a rebounded position. The platform may comprise a biasing arrangement configured to bias the undriven wheel to the rebounded position. The steering assembly may comprise the biasing arrangement. The biasing arrangement may surround the undriven wheel such that the undriven wheel occupies at least part of a central void formed by the biasing arrangement. The central void may change in volume dependent on the position of the undriven wheel along the compression axis. The void may decrease in volume when the undriven wheel moves to the compression position and increase in volume when the undriven wheel moves to the rebounded position. The steering assembly may comprise a fully collapsed state representing a maximum compression position of the undriven wheel. The steering assembly may comprise a fully rebounded state representing a maximum rebounded position of the undriven wheel. It has been recognised that locating the biasing arrangement to surround the undriven wheel, and such that the undriven wheel occupies the central void has been found to be especially space-efficient. It has therefore been found to be a particularly beneficial arrangement on a soft target moving platform.

The biasing arrangement may be compressible along a compression axis between the rebounded position and the compression position of the undriven wheel. The biasing arrangement may be expandable along the compression axis between the compression position and the rebounded position of the undriven wheel. The platform may be configured such that the compression axis is vertical to the base of the platform and/or the ground. The compression axis may be coaxial to the steering axis.

The biasing arrangement may comprise an annular biasing member surrounding the undriven wheel. The annular biasing member may be coaxial with the compression axis. Such an arrangement comprising the annular biasing member has been found to be beneficial because the annular biasing member may enable the platform to be more compact and space-efficient and have a lower profile.

The central void of the biasing arrangement may comprise a space between opposing interior edges of the biasing arrangement. The central void may be a cylindrical space.

The platform may be configured such that the biasing arrangement turns with the undriven wheel about the steering axis.

The annular biasing member may comprise a spring, for example a helical spring. In preferred arrangements, the annular biasing member may comprise an annular wave spring. Such an arrangement comprising the annular wave spring has been found to be beneficial because the annular wave spring is especially space-efficient. It may therefore enable the platform to be even more space-efficient and therefore even lower in profile.

The biasing member, for example the annular wave spring, may be a compression member that is biased to expand. The biasing member may be biased to extend in both the compression position and in the rebounded position (i.e. it is pre-loaded to expand even in the rebounded position).

The steering assembly may comprise a wheel carriage, optionally coupled to the steering motor. The wheel carriage may surround the undriven wheel. The steering assembly may comprise an axle supporting the undriven wheel. The axle may comprise two ends each mounted to the wheel carriage, such that rotation of the wheel carriage by the steering motor causes the undriven wheel to actively turn about the steering axis. The undriven wheel may be rotatably mounted to the wheel carriage. The undriven wheel may be rotatably mounted to the wheel carriage by a first axle locator located at one end of the axle and a second axle locator located at the other end of the axle. Each of the first axle locator and the second axle locator is fastened to the wheel carriage using at least one fastener, preferably a plurality of fasteners. The wheel carriage may turn with the undriven wheel commonly about the steering axis. The biasing arrangement may press against the wheel carriage to urge the undriven wheel to the rebounded position. The annular biasing member may be located circumferentially around the wheel carriage. Such an arrangement has been found to be beneficial because it may enable the steering assembly to be radially compact.

The worm wheel gear may comprise a central void. The central void may comprise a space between opposing interior edges of the worm wheel gear. The space may be a cylindrical space. The Wheel carriage may be located at least partially or nearly fully in the central void of the worm wheel gear. The worm wheel gear and the wheel carriage may be concentric. The wheel carriage may be constrained to the worm wheel gear and turn together about the steering axis. The steering assembly may be configured such that concentricity of the worm wheel gear and wheel carriage is maintained despite movement of the wheel carriage along the steering axis with respect to the worm wheel gear. A volume of the central void of the worm wheel gear that is occupied by the wheel carriage may vary as the wheel carriage and undriven wheel move along the compression axis. That volume may decrease when the undriven wheel moves towards the compression position. That volume may increase when the undriven wheel moves away from the compression position.

An annular channel may be formed between the wheel carriage and the second gear, such as the worm wheel gear. The annular biasing member may be located in the annular channel.

The axle of the undriven wheel may extend beyond each side of the undriven wheel. The axle of the undriven wheel may be mounted to the wheel carriage to provide support on both sides of the undriven wheel.

The platform, for example the steering assembly, may comprise a guide pin or pins to guide movement of the undriven wheel along the compression axis. The guide pin or pins may constrain the worm wheel gear and wheel carriage relative to each other so they turn together about the steering axis. The platform, for example the steering assembly, may comprise a through-hole for the or each of guide pins. The wheel carriage may comprise the through-hole or holes. The guide pin or pins may be fastened to the worm wheel gear. The wheel carriage may comprise two through-holes each for a guide pin, wherein the two through-holes may be diametrically opposed through-holes.

The platform, for example the steering assembly, may comprise a rebound pin or pins. The or each rebound pin comprises a shaft extending through a respective through-hole of the wheel carriage. The wheel carriage may comprise two through-holes each for a rebound pin, wherein the two through-holes may be diametrically opposed through-holes. The or each rebound pin comprises a head at one end of the shall, wherein the head has a diameter greater than a diameter of the through-hole of the wheel carriage through which the respective rebound pin extends. The head of the or each rebound pin is configured as an end stop to prevent movement of the wheel carriage along the compression axis. A shock isolator may be located on the or each rebound pin to absorb an impact between the wheel carriage and the or each rebound pin.

The platform may comprise a soft target mount or a plurality of soft target mounts for mounting a soft target or a plurality of soft targets to the base of the platform.

The platform may comprise a rear portion at a rear of the platform and a nose portion at a front of the platform. The undriven wheel may be located at the nose portion. The base of the platform may have ramped sides around a perimeter of the base. The ramped sides allow a test vehicle to progressively drive up and down the platform. The base may have a cover within the perimeter of the base and at a top of the platform.

The present invention provides, according to a second aspect, a steering assembly for use in a soft target movement platform. The steering assembly may comprise a housing mountable to a base of the platform. The steering assembly may comprise a steering motor coupled to the housing. The steering assembly may comprise an undriven wheel arranged to be actively turned about a steering axis relative to the housing by the steering motor.

The platform according to the first aspect may comprise the steering assembly according to the second aspect, wherein the steering motor of the first aspect corresponds to the steering motor of the second aspect.

The steering assembly of the second aspect may comprise any feature of the steering assembly of the first aspect.

The present invention provides, according to a third aspect, a method of operating a soil target movement platform moveable by a motive force. The platform may comprise a set of three wheels, optionally comprising two driven wheels and a freewheel. The two driven wheels may be configured to steer the platform by differential steering according to a differential torque from a first drive motor to drive one of the two driven wheels and a second drive motor to drive the other one of the two driven wheels, wherein the differential torque forms the motive force for moving the platform. The freewheel may be configured to assist steering without contributing to the motive force for moving the platform. The method may comprise actively turning the freewheel about a steering axis by a steering motor to provide steering assistance to the two driven wheels.

The actively turning may comprise, on the basis of an output from a controller, actively turning the freewheel.

According to another aspect, there is provided a soft target movement platform for carrying a soft target, the platform comprising a plurality of wheels upon which the platform moves. At least one of the wheels is moveable between a compression position and a rebounded position, and the platform comprises a biasing arrangement configured to bias the wheel to the rebounded position. The wheel may be an undriven wheel or a driven wheel driveable by a drive motor. The undriven or driven wheel may be steerable and arranged to be actively turned about a steering axis by a steering motor. The steering motor may be separate to the drive motor. The biasing arrangement may comprise a wave spring. The biasing arrangement may surround the wheel such that the wheel occupies at least part of a central void formed by the biasing arrangement. The biasing arrangement preferably comprises an annular biasing member surrounding the wheel, and the annular biasing member is preferably an annular wave spring. In some embodiments, each of the plurality of wheels may be moveable between a compression position and a rebounded position, and may comprise the above-mentioned biasing arrangement. Soft target platforms comprising a wave spring, especially but not exclusively an annular wave spring used in the above-mentioned manner, have been found to be beneficial because the annular wave spring is especially space-efficient (compared, for example, to a coil spring). It may therefore enable the platform to be even more space-efficient and therefore even lower in profile.

According to yet another aspect, there is provided a soft target movement platform for carrying a soft target, the platform comprising a plurality of wheels upon which the platform moves. The platform may comprise a steering assembly. The steering assembly may comprise a steering motor. The platform may comprise a steerable wheel. The steerable wheel may be an undriven wheel. The steerable wheel may be arranged to be actively turned about a steering axis by the steering motor. The steerable wheel may be a driven wheel driveable by a drive motor. The drive motor may be separate from the steering motor. The steering assembly may comprise a plurality of gears coupled between the steering motor and the steerable wheel. The plurality of gears may comprise a worm gear and a worm wheel gear in meshing engagement with the worm gear. Such an arrangement has been found to be beneficial because it may enable the steering assembly to be compact.

It will of course be appreciated that features described in relation to one aspect of the present invention may be incorporated into other aspects of the present invention. For example, the method of the third aspect of the invention may incorporate any of the features described with reference to the first and second aspects of the invention and vice versa.

DESCRIPTION OF THE DRAWINGS

Embodiments of the present invention will now be described by way of example only with reference to the accompanying schematic drawings of which:

FIG. 5 is a perspective view of a cross-section of the steering assembly according to the first illustrative embodiment;

FIG. 6 is an enlarged view of a portion of FIG. 5;

DETAILED DESCRIPTION

Figure 1:
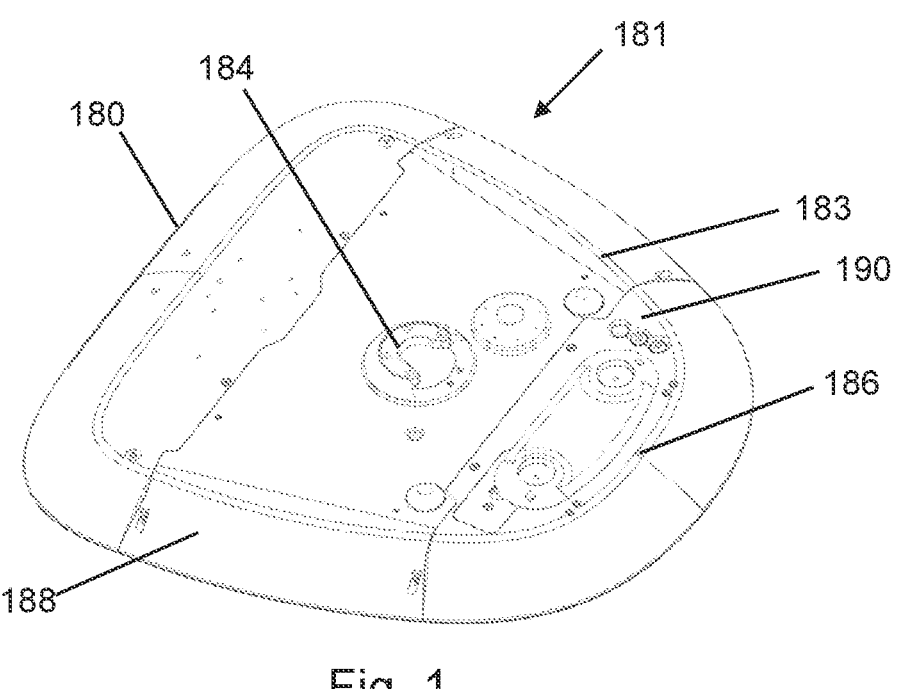
FIG. 1 is a perspective view of a soft target movement platform according to a first illustrative embodiment.
Figure 2:
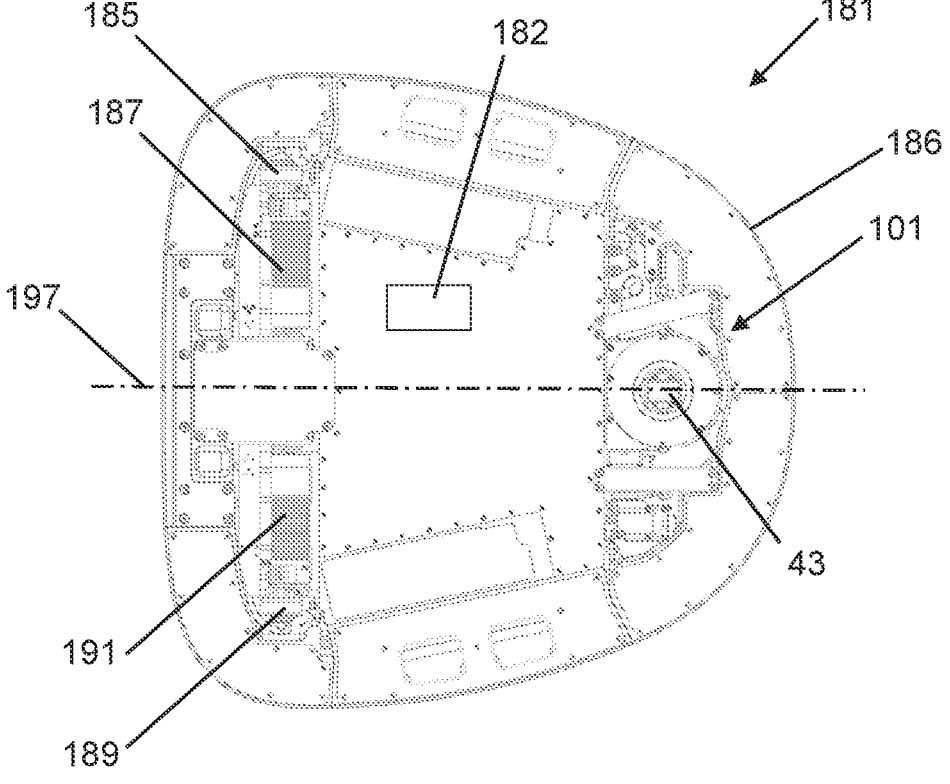
FIG. 2 is a bottom view of the soft target movement platform according to the first illustrative embodiment.
Figure 3:
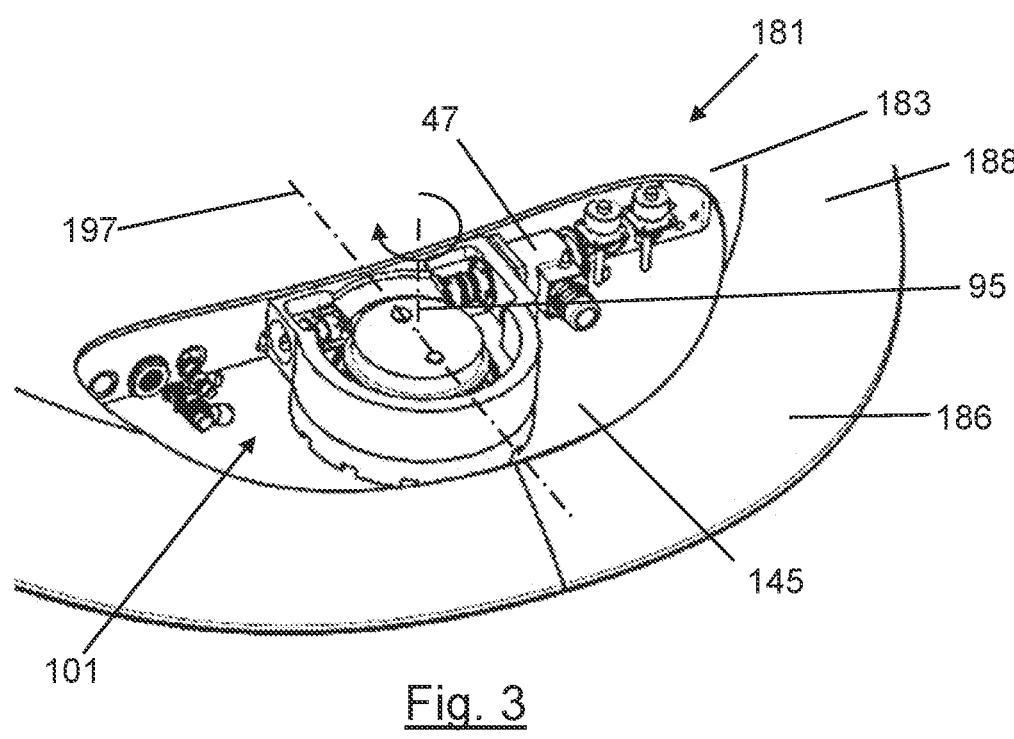
FIG. 3 is a perspective view of the front part of a soft target movement platform according to the first illustrative embodiment.
Figure 4:
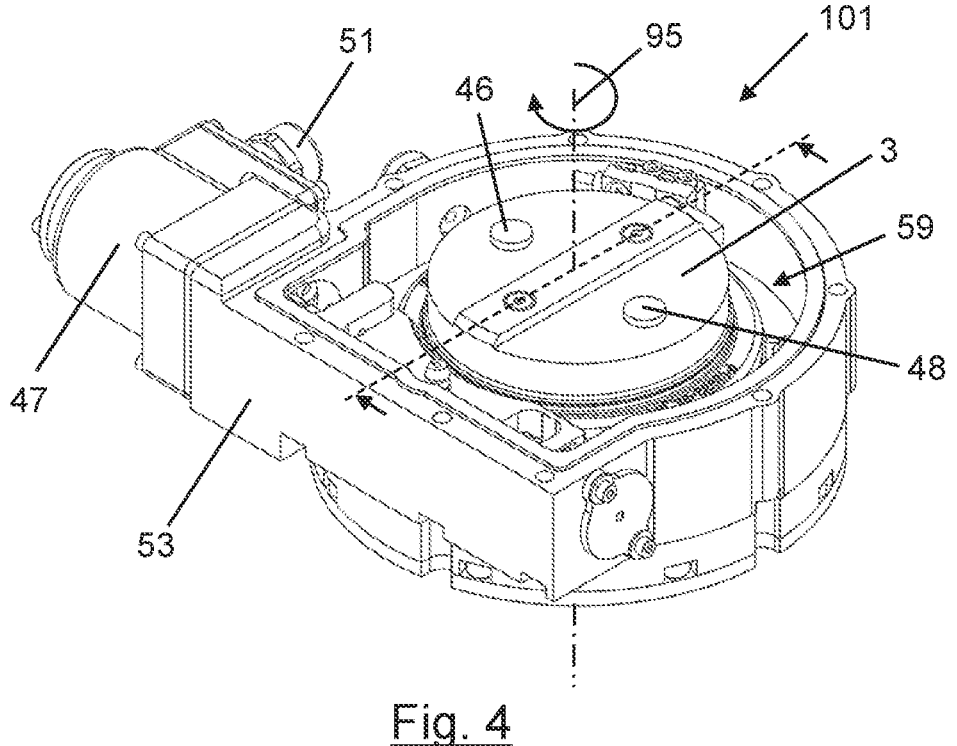
FIG. 4 is a perspective view of a steering assembly according to the first illustrative embodiment.

FIGS. 1 to 3 show a soft target movement platform 181 according to a first embodiment. The platform 181 has a central axis 197 that extends along the length of the platform 181 from a rear portion 180 at a rear of the platform 181 to a nose portion 186 at a front of the platform 181. The platform 181 comprises a base 183 having ramped sides 188 around a perimeter of the base 183, a cover 190 within the perimeter of the base 183 and at a top of the platform 181, and a soft target mount 184 for mounting a soft target (not shown) to the base 183. The ramped sides allow a test vehicle to progressively drive up, over and down the platform 181.

The platform 181 is preferably used with soft targets that mimic objects having a small footprint and turning circle, such as a test dummy pedestrian, cyclist on a bicycle, or rider on an electric kick-scooter. The platform 181 is low profile, such that the platform 181 is discreet (to minimise identification by the vehicle sensors as being part of the soft target), can safely pass under a test vehicle, and a soft target is mountable to the soft target mount 184 as close as possible to the ground.

In another embodiment, the platform 181 may comprise a cantilevered plate extending from the rear portion 180 and optionally fastened to an underside of the rear portion 180. The cantilevered plate comprises a soft target mount that is alternative or additional to and lower than the soft target mount 184 shown in FIG. 1 that enables the lowest point of a soft target to be held approximately 25 mm from the ground. The cantilevered plate therefore allows the platform 181 to closely mimic a pedestrian directly in contact with the ground.

The platform 181 comprises a set of wheels arranged to make contact with the ground over which the platform 181 travels. The set of wheels comprises three wheels being two rear wheels located in the rear portion 180 of the platform 181 and one front wheel located in the nose portion 186 of the platform 181.

The two rear wheels are driven. The single front wheel is undriven. The term "driven" describes a rotation of the wheel directly caused by a presence of an input rotation force to rotate the wheel about its rotational axis to move the wheel along the ground. The term "rotation" refers to a rolling motion of the wheel about an axis that is horizontal to a ground surface and thus may be referred to as a horizontal axis. The rolling motion of the Wheel is sufficient to propel a platform, such as the platform 181 of the first embodiment. A driven wheel can actively rotate. This enables the speed and acceleration of a driven wheel to be directly controllable. In contrast, the term "undriven" describes a lack of rotation of the wheel arising from an absence of such input rotation force. An undriven wheel can passively rotate, such that it rolls along the ground in response to active rotation of a driven wheel or friction applied to the undriven wheel from the ground surface, for example. An undriven wheel may be permanently free to rotate (unless braked) and is not configured to sufficiently propel a platform because of the absence of the input rotation force, such as the platform 181 of the first embodiment.

The two rear wheels comprise a first driven wheel 185 located on a first side of the central axis 197 and a second driven wheel 189 located on a second, opposite side of the central axis 197. Each of the first and second driven wheels 185, 189 are offset by the same degree from the central axis 197. The relative arrangement of the two rear wheels helps stabilise the platform 181 and balance side-to-side motion when travelling over ground and/or when pressed on by the test vehicle passing over the platform 181. Each of the first and second driven wheels 185, 189 comprises a rotational axis that is parallel to the other and extends in a direction perpendicular to a direction of the central axis 197.

Each of the first and second driven wheels 185, 189 can rotate but is constrained such that the first and second driven wheels 185, 189 cannot turn. Therefore, an angle between each rotational axis and the central axis 197 is fixed when viewing the platform 181 from above and, for example, when the platform 181 is uncompressed by a test vehicle. The first and second driven wheels 185, 189 roll along the ground in a rolling direction. The rolling direction is fixed in that the rolling direction cannot change relative to the central axis 197. The fixed rolling direction of the first and second driven wheels 185, 189 is parallel to the central axis 197 and extends in a longitudinal direction of the platform 181.

The platform 181 comprises a steering assembly 101 arranged at the nose 186 of the platform 181. The steering assembly 101 comprises the front wheel being an undriven wheel 43. The undriven wheel 43 comprises a rotational axis 93 about which the undriven wheel 43 can rotate (as shown in FIG. 6, for example). The rotational axis of the undriven wheel 43 can turn with respect to the central axis 197.

The term "steer", in the context of the undriven wheel, refers to turning the undriven wheel about a steering axis in order to steer a platform, such as the platform 181 of the first embodiment, in a straight-ahead/reverse, left or right direction. The steering axis is vertical to the ground surface and may be referred to as a vertical axis.

In contrast to the two rear wheels, the front wheel can steer about a steering axis 95 in order to steer the platform 181. That is, the undriven wheel 43 can turn about a vertical axis, orientated perpendicular to the central axis 197. The steering axis 95 is thus perpendicular to the horizontal central axis 197. An angle between the rotational axis 93 of the undriven wheel 43 and the horizontal central axis 197 is therefore variable. The undriven wheel 43 rolls in a rolling direction that is variable.

The platform 181 comprises a first drive motor 187 connected to the first driven wheel 185. The first drive motor 187 is an electric motor configured to provide torque to the first driven wheel 185 to cause it to rotate (roll about the rotational axis).

The platform 181 comprises a second drive motor 191 connected to the second driven wheel 189. The second drive motor 191 is an electric motor configured to provide torque to the second driven wheel 189 to cause it to rotate (roll about the rotational axis).

The platform 181 comprises a steering motor 47 connected to the undriven wheel 43. The steering motor 47 is configured to provide torque to the undriven wheel 43 to cause the undriven wheel 43 to actively turn.

The platform 181 comprises a controller 182 to control a torque output of each of the first and second drive motors 187, 191 to drive the respective first and second driven wheels 185, 189. The controller 182 also controls the steering motor 47 of the steering assembly 101 to actively turn the undriven wheel 43.

The controller 182 is configured to output a signal to each of the first and second drive motors 187, 191 to cause the respective first and second driven wheels 185, 189 to rotate. The controller 182 can cause a torque, for example an equal torque, to output from the respective first and second drive motors 187, 191 to drive the first and second driven wheels 185, 189 and cause the platform 181 (when the undriven wheel 43 is similarly aligned) to move in a straight-ahead direction.

The platform 181 is steerable by differential steering. That is, the controller 182 is configured to cause a torque output, for example an unequal torque, to be provided by the respective first and second drive motors 187, 191 to drive the first and second driven wheels 185, 189 causing the platform 181 to turn left or right. During the turn, an inner wheel, amongst the first and second driven wheels 185, 189, will have a relatively low speed of rotation, compared to an outer wheel, amongst the first and second driven wheels 185, 189, that will have a relatively high speed of rotation.

In the first embodiment of the invention, steering assistance to the platform 181 can be provided by actively turning the undriven wheel 43 about the steering axis 95 by the steering motor 47. Steering assistance can be provided before and/or during a turn. The steering assembly 101 of the first embodiment enables the platform 181 to be responsive and turn rapidly and/or with low effort, at least initially. For example, if the undriven wheel 43 was configured to passively turn, for example when provided as castor wheels, the variable rolling direction of the undriven wheel 43 may be, at least initially, misaligned with a required direction of travel of the platform 181. Actively turning the undriven wheel 43 improves manoeuvrability of the platform 181. Use of the undriven, but steered, wheel 43, as opposed to castor wheels, has also been found to improve stability of the platform 181, especially when the soft target is subjected to a crosswind.

The controller 182 controls an amount by which to turn the undriven wheel 43 depending on the differential steering of the first and second driven wheels 185, 189.

FIG. 3 shows a front part of the soft target movement platform 181 in more detail. The base 183 comprises a steering assembly bay 145 in which the steering assembly 101 is located and coupled to the base 183. In the view shown, a portion of the cover 190 is removed to allow the steering assembly bay 145 and the steering assembly 101 to be visible in FIG. 3. In use, the cover 190 covers the steering assembly bay 145 and the steering assembly 101.

Figure 7:
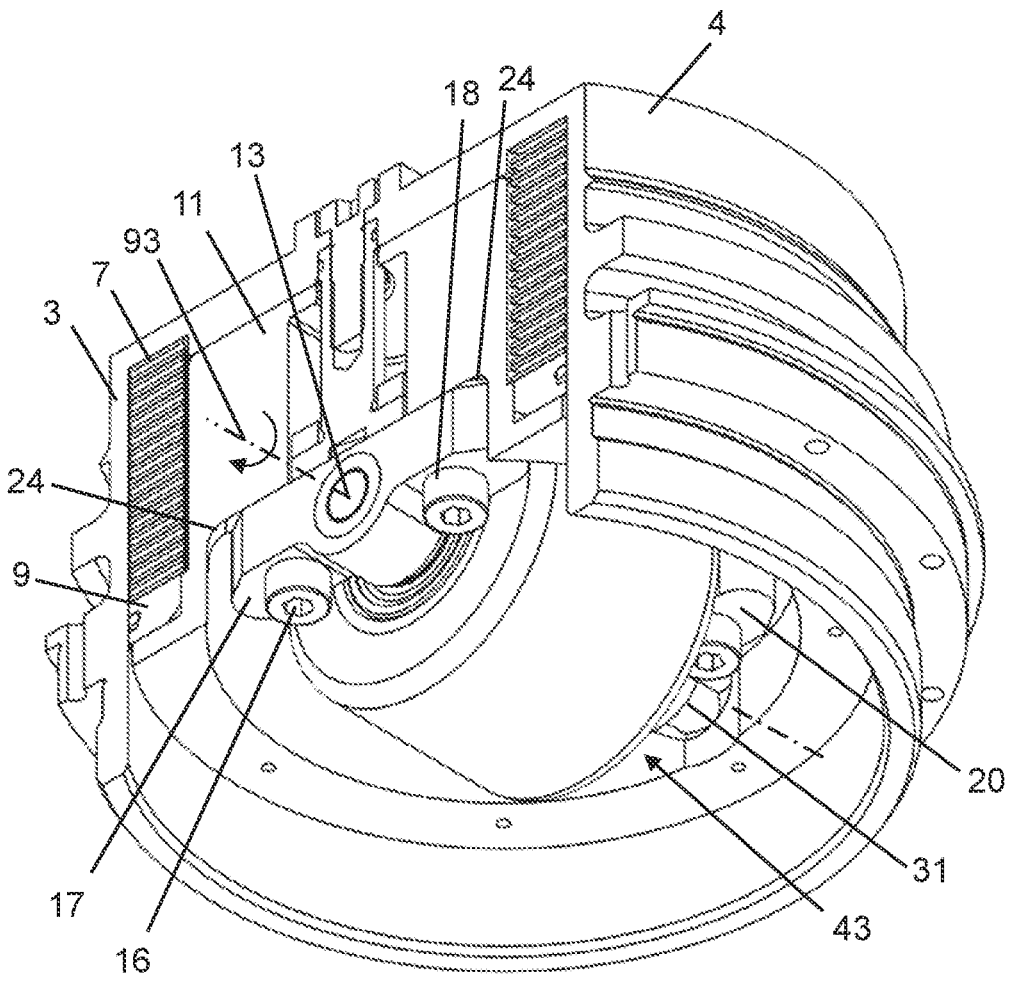
FIG. 7 is a perspective view of a cross-section of a sub-assembly according to the first illustrative embodiment.
Figure 8:
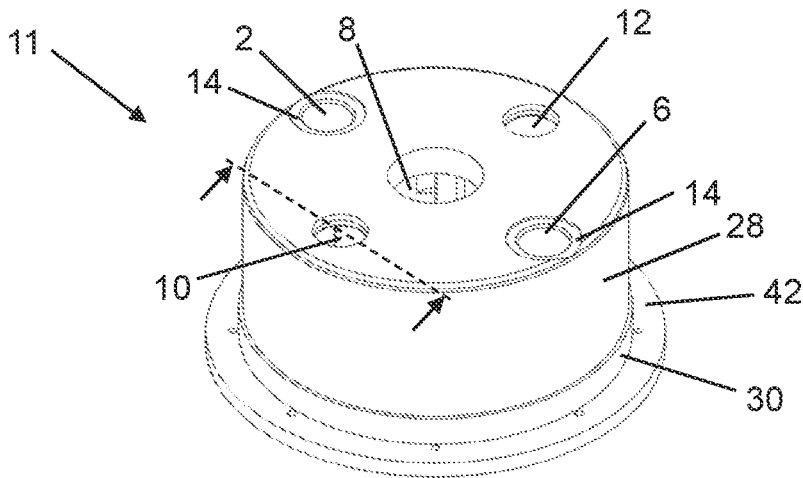
FIG. 8 is perspective top view of a wheel carriage according to the first illustrative embodiment.
Figure 9:
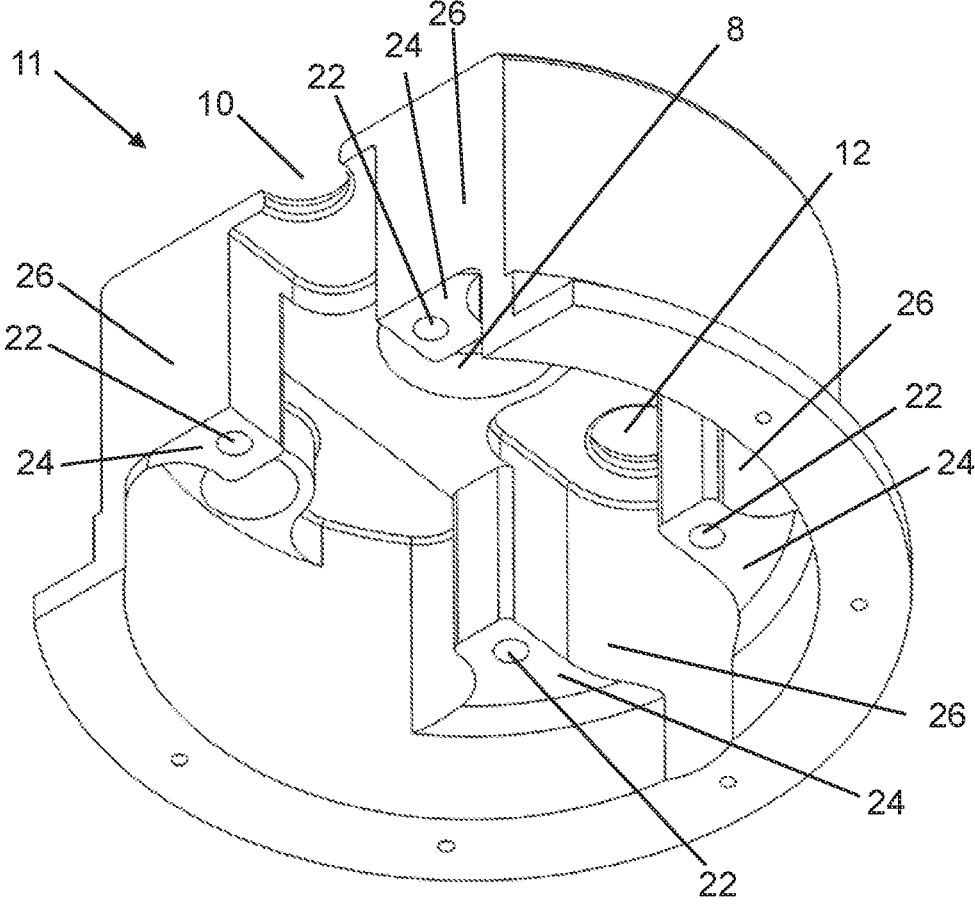
FIG. 9 is perspective bottom view of a cross-section of the wheel carriage according to the first illustrative embodiment.

The following description now focuses on the steering assembly 101. FIGS. 4 to 13 show the steering assembly 101, first shown in FIG. 3, in more detail (FIG. 7 shows a sub-assembly and FIGS. 8 and 9 show a single component). FIGS. 5, 6, 10 and 11 show a cross-section along the dashed line in FIG. 4. Although some minor differences to the steering assembly 101 are appreciable in some of FIGS. 4 to 13 compared to FIG. 3, it is confirmed that the steering assembly 101 of FIGS. 4 to 13 are part of the first embodiment, The steering assembly 101 comprises the undriven wheel 43, being the single wheel of the platform 181 that is undriven, and the steering motor 47. The steering assembly 101 comprises a first gear in the form of a worm gear 5, and a second gear in the form of a worm wheel gear 3. The steering assembly with such an arrangement has been shown to be beneficial because of improved compactness. The worm gear 5 is coupled to an output shaft (not shown) of the steering motor 47 and meshes with the worm wheel gear 3. Torque from the steering motor 47 is thus transferred to the output shaft (not shown) of the steering motor 47 to the worm gear 5 and then to the worm wheel gear 3. The undriven wheel 43 is coupled to the worm wheel gear 3 and moves with the worm wheel gear 3 so that the undriven wheel 43 turns about the steering axis 95 to provide steering assistance to the platform 181.

The steering assembly 101 comprises an electrical connector 51 for establishing an electrical connection between the controller 182 of the platform 181 and the steering motor 47.

The steering assembly 101 comprises a gear housing 53 having a gear housing cavity 59. The worm gear 5 and the worm wheel gear 3 are located within the gear housing cavity 59.

The steering assembly 101 comprises diametrically opposed first and second guide pins 46, 48 to guide vertical movement of the undriven wheel 43, as discussed in more detail in relation to FIG. 10 below.

FIG. 7 shows a perspective view of a cross-section of a sub-assembly of the steering assembly 101. The sub-assembly shows various components of the steering assembly 101 within a space defined by a circumferential wall 4 of the worm wheel gear 3 with other components of the steering assembly 101 omitted for illustration purposes. As shown in FIG. 7, the undriven wheel 43 is rotatably coupled to an axle 13 and rotates about the rotational axis 93.

Figure 10:
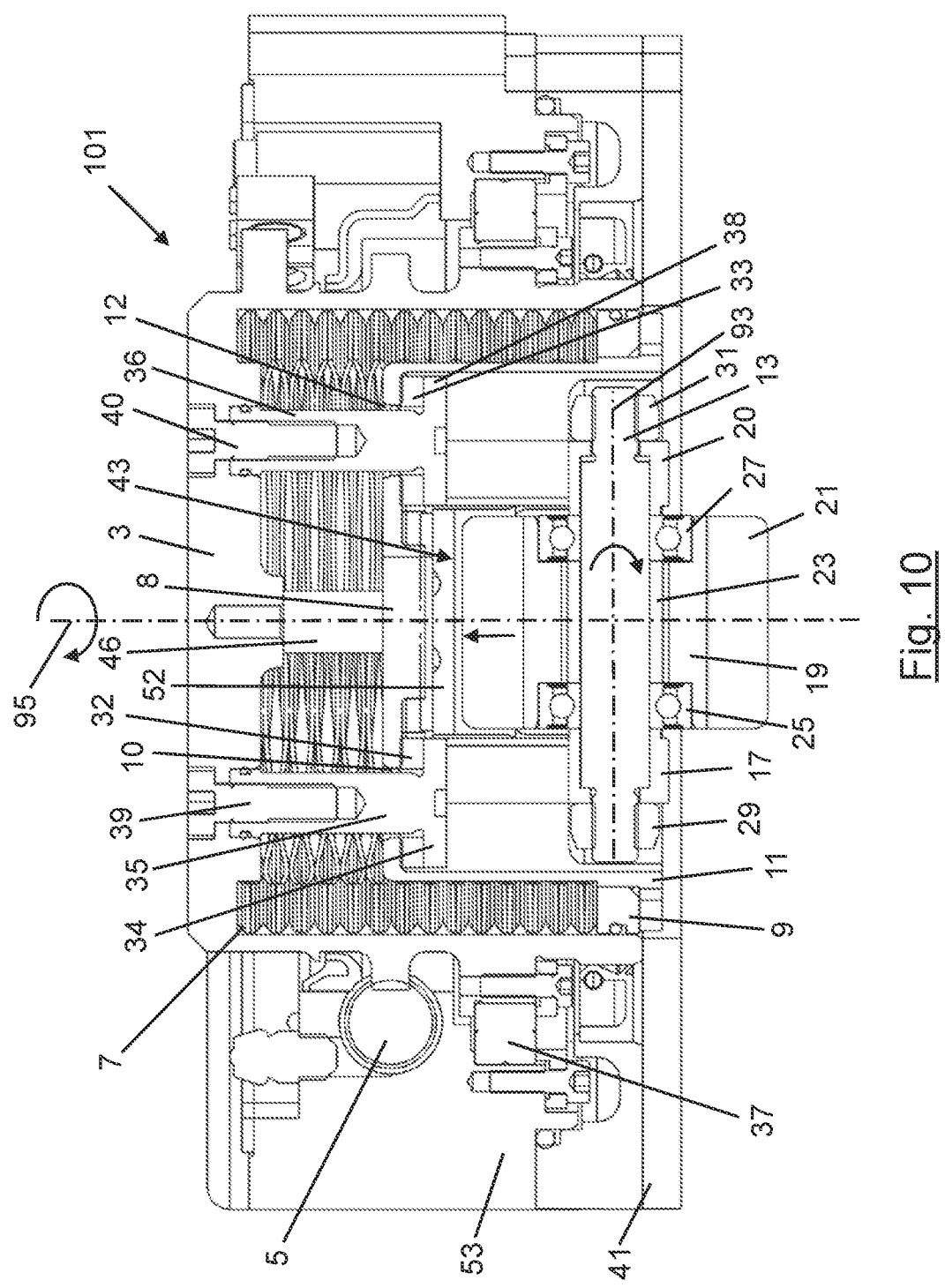
FIG. 10 is a cross-section of the steering assembly according to the first illustrative embodiment when in a fully rebounded state.
Figure 11:
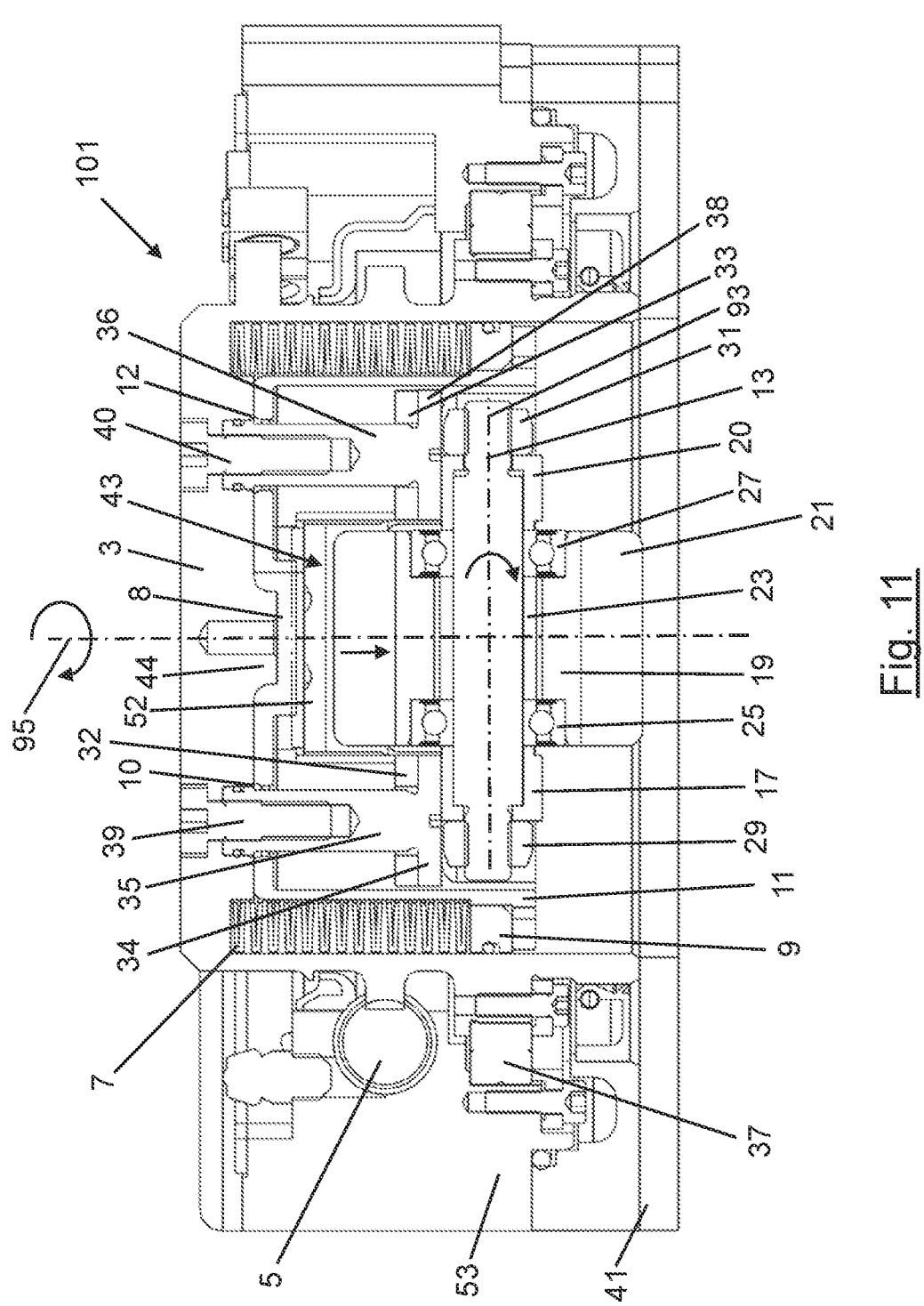
FIG. 11 is a cross-section of the steering assembly according to the first illustrative embodiment when in a fully collapsed state.

As additionally shown in FIGS. 10 and 11, the undriven wheel 43 comprises a hub 19 and a tyre 21 mounted to the hub 19. The undriven wheel 43, via the hub 19, is supported on the axle 13 by a first wheel bearing 25 and a second wheel bearing 27. The first and second wheel bearings 25, 27 are spaced apart along the axle 13 by a wheel bearing spacer 23 that is located within a width of the undriven wheel 43 and at a centre of the axle 13.

The steering assembly comprises a wheel carriage 11, as shown in isolation in FIGS. 8 and 9 and discussed below. As shown in FIGS. 7, 10 and 11, the axle 13 is coupled to the wheel carriage 11 by first and second axle locators 17, 20 that are fixed to the Wheel carriage 11 by bolts. For example, the first axle locator 17 is shown in FIG. 7 to be fixed to the wheel carriage 11 by a first end bolt 16 and a second end bolt 18.

As shown in FIGS. 10 and 11, first and second wheel nuts 29, 31 fastened to a respective threaded end portions of the axle 13 secure the first axle locator 17, the first wheel bearing 25, the wheel bearing spacer 23, the second wheel bearing 27, and the second axle locator 20 in that order between the first and second wheel nuts 29, 31. The undriven Wheel 43, axle 13, first and second wheel bearings 25, 27, and axle locators 17, 20 are located within a cavity of the wheel carriage 11 such that the wheel carriage 11 circumferentially extends around those components.

As further shown in FIGS. 10 and 11, first and second fasteners 39, 40 are inserted into and threadingly engage with an interior of respective first and second rebound pins 35, 36. Threaded engagement of each fastener 39, 40 with each respective first and second rebound pin 35, 36 fixes the fasteners 39, 40 and pins 35, 36 to a top of the worm wheel gear 3 and a head of each fastener 39, 40 fills a recess in a top surface of the worm wheel gear 3. The wheel carriage 11 comprises first and second through-holes 10, 12 (as discussed below in relation to FIGS. 8 and 9) through Which the respective first and second rebound pins 35, 36 extend. The first and second rebound pins 35, 36 comprise a respective first and second head 34, 38 that is greater in diameter than a diameter of the respective first and second through-hole 10, 12. This enables the wheel carriage 11 to be vertically constrained along a neck of the first and second rebound pins 35, 36 between the first and second head 34, 38 and an underside of the worm wheel gear 3. The coupling of the wheel carriage 11 to the worm wheel gear 3 by the fasteners 39, 40 and pins 35, 36 ensures the wheel carriage 11 turns with the worm wheel gear 3.

A first shock isolator 32 is located around the neck of the first rebound pin 35 and rests on the head of the first rebound pin 32. A second shock isolator 33 is located around the neck of the second rebound pin 36 and rests on the head of the second rebound pin 32. The first and second shock isolators 32, 33 are compressible to absorb a shock load of the wheel carriage 11 as the undriven wheel 43 rebounds, in use.

FIGS. 8 and 9 show the wheel carriage 11 in isolation. FIG. 8 shows the wheel carriage 11 from above and FIG. 9 shows a cross-section along the dashed line in FIG. 8 from below. The wheel carriage 11 comprises a central through-hole 8 located at a diametric centre of the wheel carriage 11 (as shown in FIG. 8), the first and second through-holes 10, 12 diametrically opposite each other, and third and fourth through-holes 2, 6 also diametrically opposite each other. Each of the third and fourth through-holes 2, 6 is surrounded at one end by a recessed portion 14 that is recessed into the top of the wheel carriage 11 and surrounds the respective third and fourth through-holes 2, 6.

As shown in FIG. 9, the wheel carriage 11 comprises four thickened portions 26, wherein each of the thickened portions 26 each comprising an end face 24 and a blind hole 22 extending from each end face 24. A pair of end faces 24 is to engage with each axle locator 17, 20 (see FIG. 7 showing this for the first axle locator 17) and each blind hole 22 engages with each bolt (only the first end bolt 16 and second end bolt 18 are shown in FIG. 7). The wheel carriage 11 further comprises an upper side wall 28 extending from a top of the wheel carriage 11 downwards to a lower side wall 30 from which a brim 42 projects outwardly.

As shown in FIG. 7, the steering assembly 101 comprises a lower guide 9 and an annular wave spring 7 that extends around an outside of the wheel carriage 11 and within the circumferential wall 4 of the worm wheel gear 3. The lower guide 9 is an annular ring resting on the brim 42 of the wheel carriage 11. The annular wave spring 7 is a located in an annular channel formed between the worm Wheel gear 3, the wheel carriage 11 and the lower guide 9. The annular wave spring 7 is compressible along a compression axis and biased to extend in a direction parallel to the upper and lower side walls 28, 30 of the wheel carriage 11. The compression axis is coaxial with the steering axis 95. The lower guide 9 engages an inner sidewall of the worm wheel gear 3 and with the wheel carriage 11 at the t rim 42 and the lower side wall 30.

As shown by FIG. 6, the steering assembly 101 comprises a crossed roller bearing 37. The crossed roller bearing 37 is annular and comprises an outer ring and an inner ring. The inner ring is concentric to the outer ring and can rotate relative to the outer ring. The inner ring of the crossed roller bearing 37 is clamped to the worm wheel gear 3. This fixes the worm wheel gear 3 to the inner ring of the crossed roller bearing 37 so that the worm wheel gear 3 is rotatable with the inner ring about the outer ring of the crossed roller bearing 37. The outer ring of the crossed roller bearing 37 is clamped to the gear housing 53. This fixes the gear housing 53 to the outer ring of the crossed roller bearing 37.

As shown in FIGS. 10 and 11, the steering assembly 101 comprises a wear pad 41 and a mud guard 52. The wear pad 41 is coupled to the gear housing 53 and the mud guard 52 is coupled to the wheel carriage 11. In this embodiment, the wear pad 41 is attached using a high strength double-sided tape. The wear pad 41 protects an underside of the steering assembly 101 from impacts with the ground and the mud guard 52 protects an underside of the wheel carriage 11 from dirt ingress flicking from the undriven wheel 43 and entering the steering assembly 101.

Figure 12:
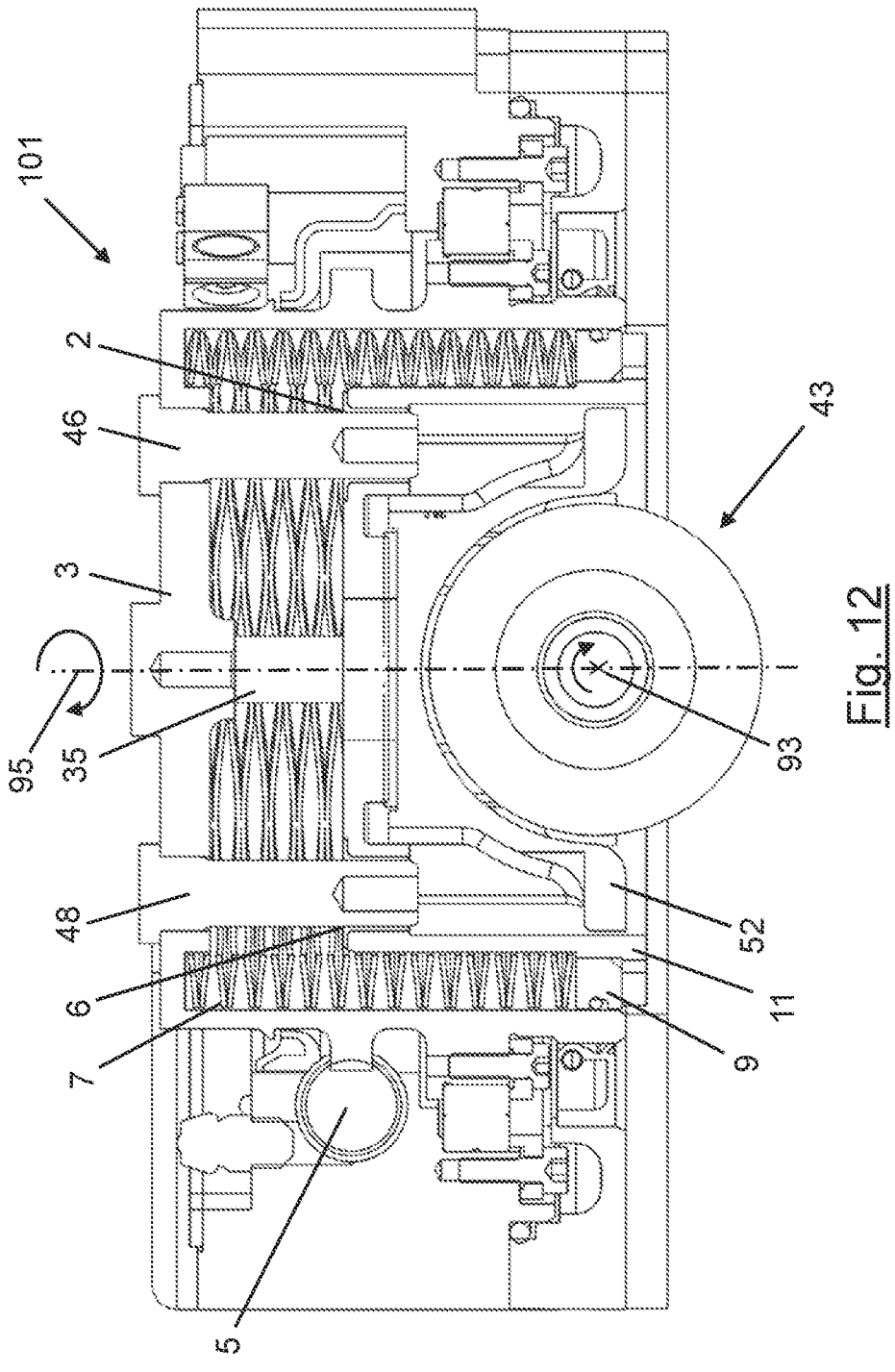
FIG. 12 is a cross-section of the steering assembly according to the first illustrative embodiment when in the fully rebounded state and with an undriven wheel turned 90 degrees from the full rebounded state of FIG. 7.

The turning action of the undriven wheel 43 can be understood when studying FIGS. 6 and 7 in combination with FIGS. 10 to 12.

An output shaft (not shown) of the steering motor 47 (shown in FIG. 4) drives the worm gear 5 and causes the worm gear 5 to rotate about a first rotational axis 94 corresponding to the longitudinal axis of the worm gear 5. Meshing engagement of the worm gear 5 and worm wheel gear 3 causes the worm wheel gear 3 to rotate about a second rotational axis corresponding to the steering axis 95 as the worm gear 5 rotates (the second rotational axis being perpendicular to the first rotational axis). Rotational movement of the worm wheel gear 3 within the gear housing 53 is supported by the crossed roller bearing 37. The crossed roller bearing 37 carries forces in a plurality of directions, for example axially along the steering axis 95 and radially to the steering axis 95, so enables the steering assembly 101 to be compact.

The undriven wheel 43 rotates with the worm wheel gear 3 by virtue of the coupling between the worm wheel gear 3 and the wheel carriage 11 by the first and second fasteners 39, 40 (only the first fastener 39 is visible in FIG. 6, both being visible in FIGS. 10 and 11). The first and second fasteners 39, 40, that are fixed to the first and second rebound pins 35, 36, urge the first and second rebound pins 35,36 against a respective adjacent wall defining the first and second through-holes 10, 12 of the wheel carriage 11 (as shown in FIGS. 10 and 11). Urging the wheel carriage 11 causes the undriven wheel 43 to turn about the steering axis 95.

When fitted to the platform 181, the first rotational axis 94 of the worm gear 5 extends in a direction perpendicular to the direction of the central axis 197 of the platform 181. The first rotational axis 94 of the worm gear 5 is also fixed in relation to the central axis 197 of the platform 181. Movement of the worm wheel gear 3 steers the undriven wheel.

The undriven wheel 43 and wheel carriage 11 can move towards and away from the worm wheel gear 3 by compression and expansion of the annular wave spring 7 within the annular channel (between the worm wheel gear 3 and the wheel carriage 11) along the compression axis. This enables the undriven wheel 43 to have a compression position and a rebounded position.

FIG. 10 shows the steering assembly 101 in a fully rebounded state and FIG. 11 shows the steering assembly 101 in a fully collapsed state. The steering assembly 101 is biased towards the fully rebounded state by the wave annular spring 7 exerting on the wheel carriage 11 via the lower guide 9. The steering assembly 101 moves towards the fully collapsed state when the annular wave spring 7 is compressed and an upper side of the wheel carriage 11 engages with a lower side of the worm wheel gear 3 as shown in FIG. 11.

The platform 181 will comprise an unsprung mass and a sprung mass. The unsprung mass of the platform 181 comprises the undriven wheel 43 and wheel carriage 11. The sprung mass of the platform 181 includes the mass of the base 183, optionally the mass of the soft target, and the mass of the components of the steering assembly 101 vertically fixed relative to the base 183, such as the steering motor 47, gear housing 53, worm gear 5, and worm wheel gear 3. The sprung mass is supported by the annular wave spring 7 and therefore exerts force on the annular wave spring 7 which can cause the annular wave spring 7 to compress to a degree. However, the annular wave spring 7 is configured such that a displacement caused by the unsprung mass alone is negligible compared to the total possible displacement of the annular wave spring 7 between the fully rebounded and collapsed states of the steering assembly 101. This enables the steering assembly 101 to compress When travelling over bumps in the ground and when acted on by a test vehicle.

In the fully rebounded state, shown in FIG. 10, the undriven wheel 43 is in a maximum rebounded position. In the fully rebounded state, the wheel carriage 11 presses against the first and second shock isolators 32, 33 due to an expansion force from the annular wave spring 7 exerted on the worm wheel gear 3 and the wheel carriage 11 via the lower guide 9. The first and second shock isolators 32, 33 are level so that the wheel carriage 11 is also level with respect to the worm wheel gear 3. A portion of the tyre 21 and hub 19 of the undriven wheel 43 protrude away from a central aperture of the wear pad 41.

FIG. 10 shows the annular wave spring 7 in an expanded state compared to a compressed state of FIG. 11. In the expanded state, the annular wave spring 7 is still under compression. This enables the undriven wheel 43 to be locked into rebound when the steering assembly 101 is in the fully rebounded state.

In the fully collapsed state, shown in FIG. 11, the undriven wheel 43 is in a maximum compression position. In the fully collapsed state, the annular wave spring 7 is not fully compressed per se, but the undriven wheel 43 cannot move closer to the worm wheel gear 3 because of abutment between components of the steering assembly 101. Thus, a lowermost point of the undriven wheel 43 is above a lowermost point of the wear pad 41.

The wear pad 41 provides a layer of protection for the steering assembly 101. Therefore, the undriven wheel 43 is only expected to be in contact with the ground and in the fully collapsed state when the wear pad 41 is worn away completely. However, wear of the tyre 21 of the undriven wheel 43 is to be expected.

The fully collapsed state is only ever expected to be reached when there is no wear of the tyre 21 and the wear pad 41 is absent. In use, when the platform 181 is driven over, the base 183 of the platform 181 takes the load of the test vehicle rather than the steering assembly 101 absorbing load from the test vehicle. The undriven wheel 43 can therefore fully recess within the worm wheel gear 3 and wear pad 41.

In the fully collapsed state, the first and second axle locators 17, 20 engage with the respective first and second rebound pins 35, 36 and an upper surface of the wheel carriage 11 engages with a lower surface of the worm wheel gear 3. On impact, energy is transmitted from the undriven wheel 43 to the gear housing 53 via the wheel carriage 11 and worm wheel gear 3. The thickened portions 26 help to distribute the energy from the axle locators 17, 20.

In the fully collapsed state, a clearance exists between the first and second wheel nuts 29, 31 and the respective first and second rebound pins 35, 36 in the fully collapsed state. This helps to minimise packaging space of the steering assembly 101, which is at a premium in the vertical direction in order to provide a low profile platform to which the steering assembly 101 can be mounted.

The central through-hole 8 of the wheel carriage 11 receives a central protuberance 44 of the worm wheel gear 3 when in the fully collapsed state, wherein the central protuberance 44 is at a diametric centre of the worm wheel gear 3 and extends towards the undriven wheel 43 from a surrounding downwardly facing surface of the worm wheel gear 3.

When the annular wave spring 7 is compressed, the spring biases the steering assembly 101 towards the fully rebounded state, as shown in FIG. 10. The annular wave spring 7 pushes against the worm wheel gear 3 and the lower guide 9 to urge the worm wheel gear 3 and the wheel carriage 11 apart. The annular wave spring 7 thus forces the components of FIG. 7 (for example, the undriven wheel 43, axle 13, axle locators 17, 20, wheel carriage 11, lower guide 9, and annular wave spring 7) away from the worm wheel gear 3.

When moving along the compression axis, the wheel carriage 11 moves along the first guide pin 46 and second guide pin 48 (not visible in FIG. 10) extending through the third and fourth through-holes 2, 6, respectively. The first and second through-holes 10, 12 concurrently move along the respective first and second rebound pins 35, 36. The annular wave spring 7 continues to expand until an underside of the wheel carriage 11 abuts an upper side of the first and second shock isolators 32, 33.

Figure 13:
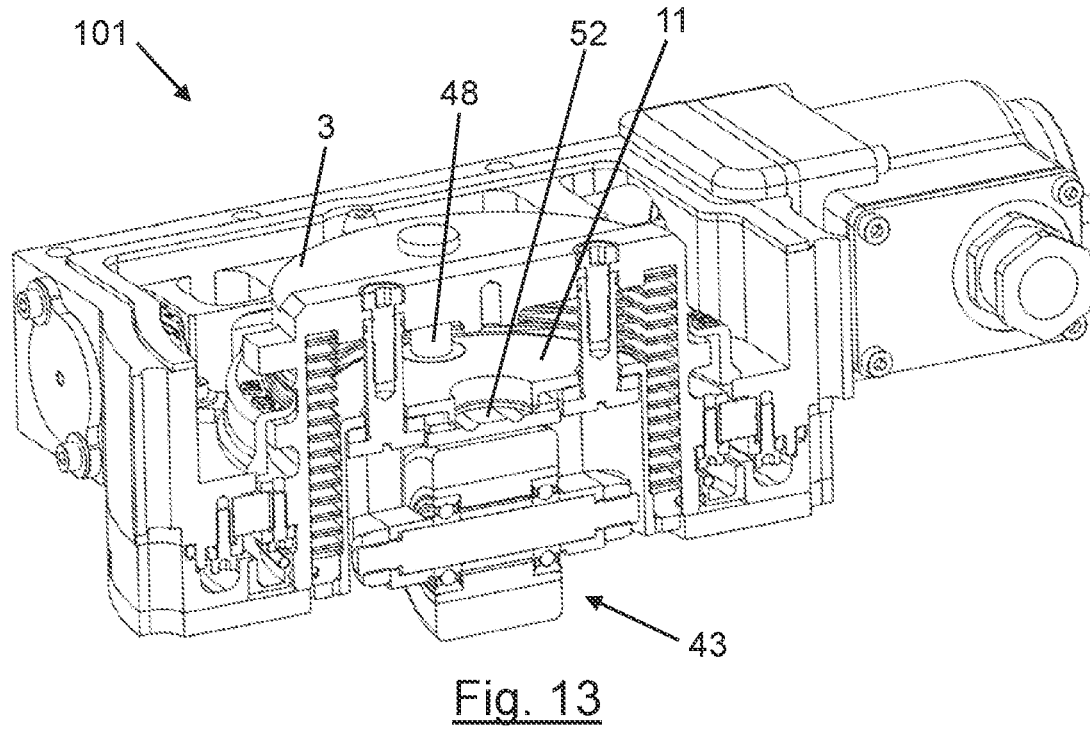
FIG. 13 is a perspective view of a second cross-section of the steering assembly of FIG. 12 according to the first illustrative embodiment.

FIGS. 12 and 13 show the steering assembly 101 in a rotated and fully rebounded state, whereby the cross-sections that are shown are taken 90 degrees apart and FIG. 13 is a perspective view to show a relative depth of the various components. The components of the sub-assembly of FIG. 7 (for example, the undriven wheel 43, axle 13, axle locators 17, 20, wheel carriage 11, lower guide 9, and annular wave spring 7) are rotated by the worm wheel gear 3 through an angle of 90 degrees from the orientation shown in FIG. 10.

Figure 14:
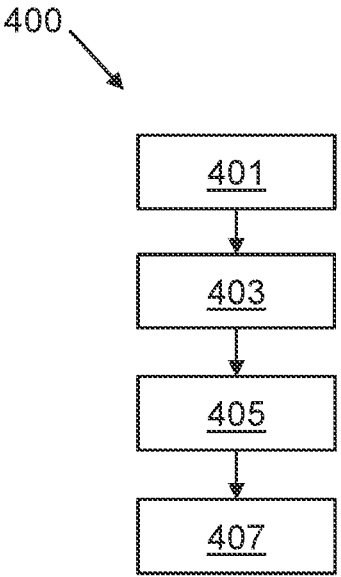
FIG. 14 is a diagram showing a method of operating a soft target movement platform according to a second illustrative embodiment.

FIG. 14 shows a method 400 of operating a soft target movement platform, such as the platform 181 of the first embodiment. The platform comprises a set of three wheels. The set of three wheels comprises two driven wheels and a freewheel. The freewheel is an undriven wheel such as the undriven wheel 43 of the first embodiment. The freewheel is permanently free to rotate without providing a driving force from the platform to rotate the freewheel. Thus, the platform is two-wheel drive.

The two driven wheels are configured to steer the platform by differential steering. The differential steering comprises a differential torque from two drive units that in combination provide a motive force for moving the platform. Each drive unit is configured to drive each of the undriven wheels. The freewheel is configured to assist steering without contributing to the motive force for moving the platform.

The method 400 comprises actively turning 401 the freewheel about a steering axis by a steering motor to provide the steering assistance to the two driven wheels.

The actively turning 401 the freewheel may be enabled by any one of the steering assemblies disclosed herein, such as the steering assembly 101 of the first embodiment.

The method 400 optionally comprises providing differential steering 403 using the motive force from the two driven wheels and applying a differential torque to the two driven wheels.

The method 400 optionally comprises collapsing 405 the freewheel to a collapsed state, such as a fully collapsed state. The method 400 optionally comprises rebounding 407 the freewheel from the collapsed state towards a rebounded state, such as a fully rebounded state. Examples of the fully collapsed state and fully rebounded state are shown in the first embodiment. Beneficially, the base of the platform can carry the load of a test vehicle driving over the platform.

The rebounding 407 the freewheel may be enabled by any one of the steering assemblies disclosed herein, such as the steering assembly 101 of the first embodiment.

Figure 15:
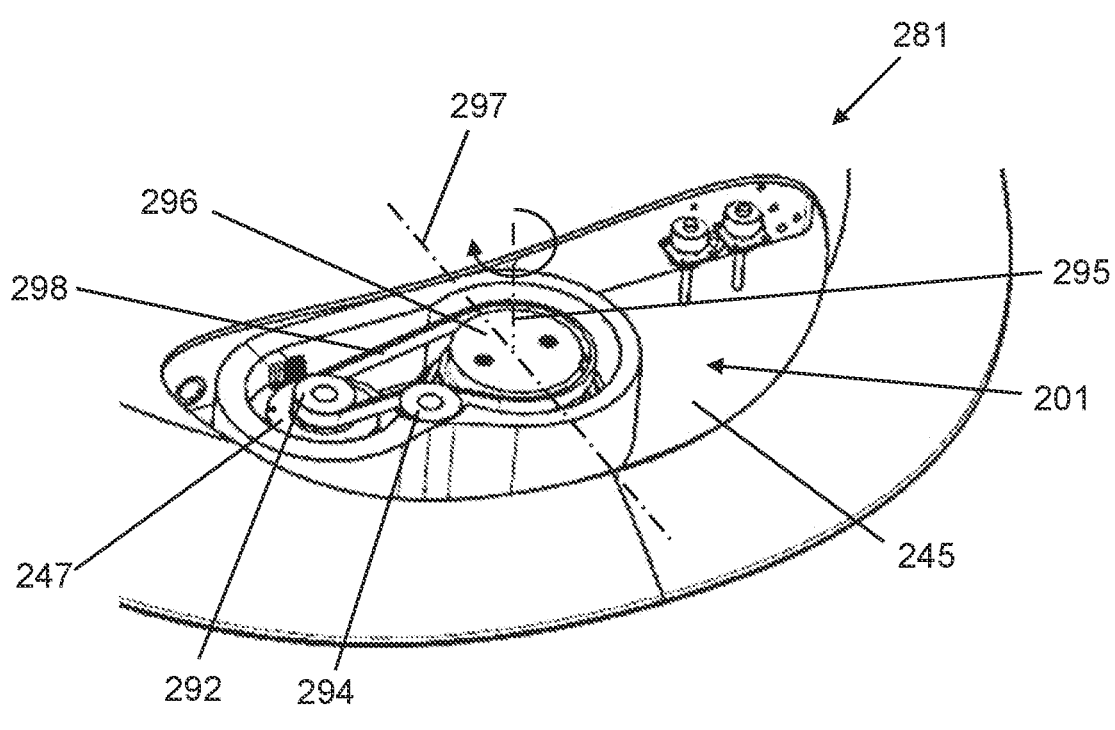
FIG. 15 is a perspective view of part of a soft target movement platform according to a third illustrative embodiment.

FIG. 15 shows a platform 281 according to a second embodiment, Features of the platform 281 of the second embodiment that are common with the platform 181 of the first embodiment are incremented by 100. Similarities of those features are not discussed in detail in favour of a discussion of differences between the first and second embodiments.

The platform 281 comprises a central axis 297 and a steering assembly 201 located in a steering assembly bay 245. The steering assembly 281 comprises a steering motor 247 offset from the central axis 297. The steering motor 247 comprises a rotational axis (not shown) perpendicular to and spaced from the central axis 297. An output shaft (not shown) of the steering motor 247 is coupled to and drives a master pulley 292. The master pulley 292 is coupled to a slave pulley 296 by an endless belt 298. A single undriven wheel (not shown) turns about a steering axis 295 by action of the steering motor 247 that drives the pulleys 292, 296 and the endless belt 298. A belt tensioner 294 maintains a tension of the endless belt 298 during transmission of torque from the steering motor 247 to the single undriven wheel (not shown). The steering assembly 201 of the second embodiment is less space-efficient than the steering assembly 101 of the first embodiment.

Figure 16:
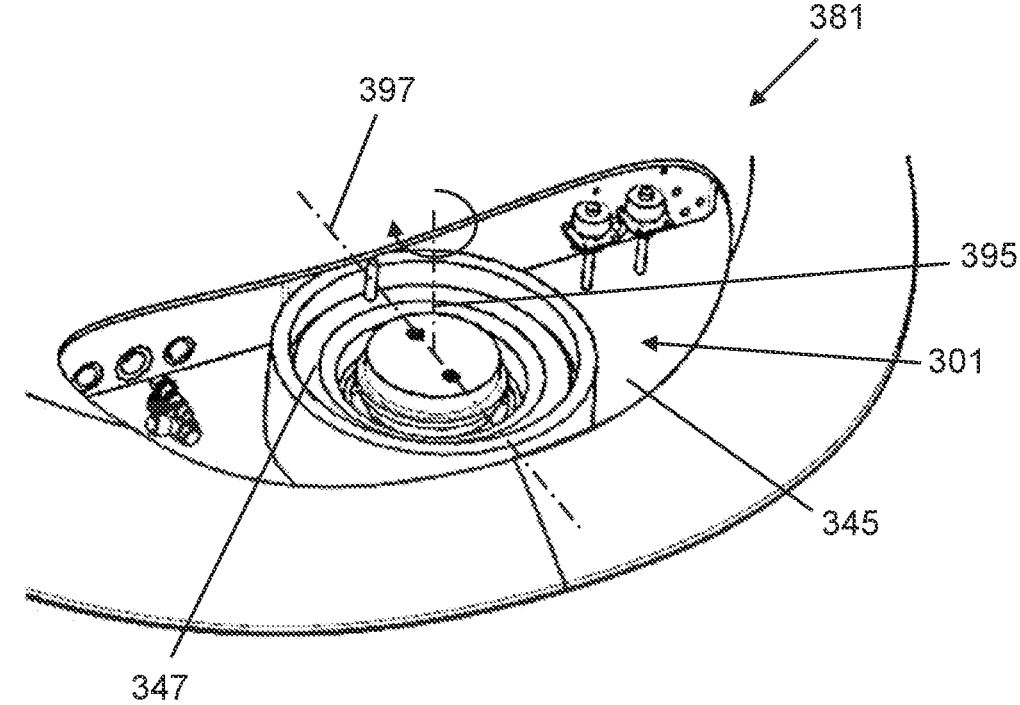
FIG. 16 is a perspective view of part of a soft target movement platform according to a fourth illustrative embodiment.

FIG. 16 shows a platform 381 according to a third embodiment. Features of the platform 381 of the third embodiment that are common with the platform 181 of the first embodiment are incremented by 200. Similarities of those features are not discussed in detail in favour of a discussion of differences between the first, second and third embodiments.

The platform 381 comprises a central axis 397 and a steering assembly 301 located in a steering assembly bay 345. The steering assembly 301 comprises a steering motor 347, arranged on the central axis 397. The steering motor 347 is a direct drive brushless motor comprising a rotational axis (not shown) perpendicular to and crossing the central axis 397. A single undriven wheel (not shown) turns about a steering axis 395 by action of the steering motor 347 to provide steering assistance to the platform 381. The steering assembly 301 of the third embodiment is more space-efficient than the steering assembly 201 of the second embodiment but less so than the steering assembly 101 of the first embodiment.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

Although the soft target platforms 181, 281, 381 of the first to third embodiments are described with a front (and the platform 181 of the first embodiment is described with a rear), a skilled person will understand that this orientation is switchable depending on the direction of travel. For example, each drive motor may be back-driveable to effectively reverse the platforms.

Any of the soft target platforms as described may comprise multiple possible mounting positions for a soft target, for example, a plurality of soft target mounts each for mounting a portion of a soft target (not shown) to the base. For example, the platform may have at least one central soft target mount located at the central axis of the platform and/or at least one soft target mount located to a side of the central axis.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A soft target movement platform for carrying a soft target, the soft target movement platform comprising:
a first drive motor;
a first driven wheel driveable by the first drive motor;
a second drive motor;

a second driven wheel driveable by the second drive motor; and
a steering assembly comprising:
a steering motor; and
an undriven wheel arranged to be actively turned about a steering axis by the steering motor;
wherein the soft target movement platform is steerable by a differential torque from the first and second drive motors to the respective first and second driven wheels, and steering assistance is provided by actively turning the undriven wheel about the steering axis by the steering motor,
wherein the undriven wheel is moveable between a compression position and a rebounded position, and the soft target movement platform comprises a biasing arrangement configured to bias the undriven wheel to the rebounded position, wherein the biasing arrangement surrounds the undriven wheel such that the undriven wheel occupies at least part of a central void formed by the biasing arrangement.

2. The soft target movement platform according to claim 1, wherein the steering assembly comprises:
a first gear coupled to the steering motor; and
a second gear coupled to the first gear and the undriven wheel, such that rotation of the second gear by the steering motor causes the undriven wheel to actively turn about the steering axis.

3. The soft target movement platform according to claim 2, wherein a rotational axis of the first gear is perpendicular to a rotational axis of the second gear.

4. The soft target movement platform according to claim 3, wherein the rotational axis of the second gear is coaxial with the steering axis.

5. The soft target movement platform according to claim 3, wherein the first gear is a worm gear and the second gear is a worm wheel gear in meshing engagement with the worm gear.

6. The soft target movement platform according to claim 1, wherein the biasing arrangement is compressible along a compression axis between the rebounded position and the compression position of the undriven wheel.

7. The soft target movement platform according to claim 6, wherein the compression axis is coaxial to the steering axis.

8. The soft target movement platform according to claim 6, comprising a guide pin to guide movement of the undriven wheel along the compression axis.

9. The soft target movement platform according to claim 1, wherein the biasing arrangement comprises an annular biasing member surrounding the undriven wheel.

10. The soft target movement platform according to claim 9, wherein the annular biasing member is an annular wave spring.

11. The soft target movement platform according to claim 1, wherein the steering assembly comprises:
a wheel carriage coupled to the steering motor; and
an axle supporting the undriven wheel, wherein the axle comprises two ends each mounted to the wheel carriage, such that rotation of the wheel carriage by the steering motor causes the undriven wheel to actively turn about the steering axis.

12. A steering assembly for use in a soft target movement platform, the steering assembly comprising:
a housing mountable to a base of the soft target movement platform;
a steering motor coupled to the housing; and an undriven wheel arranged to be actively turned about a steering axis relative to the housing by the steering motor, wherein the undriven wheel is moveable between a compression position and a rebounded position, and the steering assembly comprises a biasing arrangement configured to bias the undriven wheel to the rebounded position, wherein the biasing arrangement surrounds the undriven wheel such that the undriven wheel occupies at least part of a central void formed by the biasing arrangement.

13. The steering assembly according to claim 12, comprising:

a first gear coupled to the steering motor; and a second gear coupled to the first gear and the undriven wheel, such that rotation of the second gear by the steering motor causes the undriven wheel to actively turn about the steering axis.

14. The steering assembly according to claim 13, wherein a rotational axis of the first gear is perpendicular to a rotational axis of the second gear.

15. A method of operating a soft target movement platform moveable by a motive force, the soft target movement platform comprising a set of three wheels, the set of three wheels comprising:

two driven wheels to steer the soft target movement platform by differential steering according to a differential torque from a first drive motor to drive one of the two driven wheels and a second drive motor to drive the other one of the two driven wheels, wherein the differential torque forms the motive force for moving the soft target movement platform; and a freewheel to assist steering without contributing to the motive force for moving the soft target movement platform;

the method comprising:

actively turning the freewheel about a steering axis by a steering motor to provide steering assistance to the two driven wheels;

collapsing the freewheel to a collapsed state; and rebounding the freewheel from the collapsed state towards a rebounded state, the soft target movement platform comprising a biasing arrangement configured to bias the freewheel to the rebounded state, wherein the biasing arrangement surrounds the freewheel such that the freewheel occupies at least part of a central void formed by the biasing arrangement.

16. A soft target movement platform for carrying a soft target, the soft target movement platform comprising:

a plurality of wheels upon which the soft target movement platform moves, wherein at least one of the wheels is moveable between a compression position and a rebounded position;

a biasing arrangement configured to bias the moveable wheel to the rebounded position, wherein the biasing arrangement comprises an annular biasing member surrounding the moveable wheel such that the moveable wheel occupies at least part of a central void formed by the biasing arrangement.

17. The soft target movement platform according to claim 16, wherein the biasing arrangement is compressible along a compression axis between the rebounded position and the compression position.

18. The soft target movement platform according to claim 16, wherein the annular biasing member comprises an annular wave spring.

19. The soft target movement platform according to claim 16, wherein the moveable wheel is a caster wheel.

* * * * *